United States Patent
Yamamoto et al.

(10) Patent No.: US 11,296,327 B2
(45) Date of Patent: Apr. 5, 2022

(54) POSITIVE ELECTRODE ACTIVE MATERIAL, POSITIVE ELECTRODE, LITHIUM-ION SECONDARY BATTERY, AND METHOD OF PRODUCING POSITIVE ELECTRODE ACTIVE MATERIAL

(71) Applicant: TOYOTA JIDOSHA KABUSHIKI KAISHA, Toyota (JP)

(72) Inventors: Kunimitsu Yamamoto, Toyota (JP); Yoshinari Makimura, Nagakute (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 173 days.

(21) Appl. No.: 16/352,352

(22) Filed: Mar. 13, 2019

(65) Prior Publication Data
US 2019/0319271 A1 Oct. 17, 2019

(30) Foreign Application Priority Data
Apr. 16, 2018 (JP) .............................. JP2018-078318

(51) Int. Cl.
| | | |
|---|---|---|
| H01M 4/62 | (2006.01) |
| H01M 4/525 | (2010.01) |
| H01M 10/0525 | (2010.01) |
| H01M 4/583 | (2010.01) |
| H01M 4/02 | (2006.01) |

(52) U.S. Cl.
CPC ........... *H01M 4/628* (2013.01); *H01M 4/525* (2013.01); *H01M 4/5835* (2013.01); *H01M 10/0525* (2013.01); *H01M 2004/028* (2013.01)

(58) Field of Classification Search
CPC ....... H01M 10/0525; H01M 2004/028; H01M 4/525; H01M 4/628; H01M 4/131; H01M 4/133; H01M 4/136; H01M 4/1391; H01M 4/1393; H01M 4/1397; H01M 4/364; H01M 4/5835
See application file for complete search history.

(56) References Cited

U.S. PATENT DOCUMENTS

2011/0053003 A1* 3/2011 Deguchi ............... H01M 4/131
429/336

FOREIGN PATENT DOCUMENTS

| JP | 2000353523 A | * 12/2000 |
|---|---|---|
| JP | 2007-103119 A | 4/2007 |
| JP | 2008-536285 A | 9/2008 |
| JP | 2013-510393 A | 3/2013 |
| JP | 2015-118801 A | 6/2015 |
| JP | 2017-139168 A | 8/2017 |
| WO | 2006/109930 A1 | 10/2006 |
| WO | 2010/090028 A1 | 8/2010 |
| WO | 2011/054441 A1 | 5/2011 |

* cited by examiner

*Primary Examiner* — Basia A Ridley
*Assistant Examiner* — Heng M. Chan
(74) *Attorney, Agent, or Firm* — Oliff PLC

(57) ABSTRACT

A positive electrode active material contains at least: fluorine in an amount not lower than 0.08 mass %; carbon in an amount not lower than 0.02 mass %; and lithium-metal composite oxide particles making up the remainder. The lithium-metal composite oxide particles contain nickel in an amount not lower than 60 mol % of the total amount of metallic elements. At least a partial amount of each of the fluorine and the carbon is present on surfaces of the lithium-metal composite oxide particles.

10 Claims, 5 Drawing Sheets

POSITIVE ELECTRODE ACTIVE MATERIAL, POSITIVE ELECTRODE, LITHIUM-ION SECONDARY BATTERY, AND METHOD OF PRODUCING POSITIVE ELECTRODE ACTIVE MATERIAL

This nonprovisional application claims priority to Japanese Patent Application No. 2018-078318 filed on Apr. 16, 2018, with the Japan Patent Office, the entire contents of which are hereby incorporated by reference.

BACKGROUND

Field

The present disclosure relates to a positive electrode active material, a positive electrode, a lithium-ion secondary battery, and a method of producing a positive electrode active material.

Description of the Background Art

Japanese Patent Laying-Open No. 2017-139168 discloses a nickel-rich (Ni-rich) positive electrode active material.

SUMMARY

The "Ni-rich positive electrode active material" refers to a lithium-metal composite oxide (such as $LiNi_{1/3}Co_{1/3}Mn_{1/3}O_2$) that has a particularly high Ni content. In a typical Ni-rich positive electrode active material, the Ni content is not lower than 60 mol % of the total amount of metallic elements. A Ni-rich positive electrode active material may have a high capacity.

In a Ni-rich positive electrode active material, the valence of Ni is unstable. The changes in the valence of Ni may increase the likelihood of release of lithium (Li) ions and thereby increase the likelihood of reaction of the Li ions with atmospheric moisture and the like. As a result of the reaction of the Li ions with moisture, an alkaline component (such as lithium hydroxide) may be formed on a surface of the Ni-rich positive electrode active material.

Typically, a positive electrode of a lithium-ion secondary battery is produced by paste application. The paste is prepared by mixing a positive electrode active material, a binder, a solvent, and the like. When the paste contains a Ni-rich positive electrode active material, the paste tends to have a high viscosity and a short pot life. It may be because the alkaline component formed on a surface of the Ni-rich positive electrode active material causes degradation of the binder.

An object of the present disclosure is to mitigate alkaline component formation on a Ni-rich positive electrode active material.

In the following, the technical structure and the effects according to the present disclosure are described. It should be noted that part of the action mechanism according to the present disclosure is based on presumption. Therefore, the scope of claims should not be limited by whether or not the action mechanism is correct.

[1] A positive electrode active material according to the present disclosure is a positive electrode active material for a lithium-ion secondary battery. The positive electrode active material contains at least fluorine in an amount not lower than 0.08 mass %, carbon in an amount not lower than 0.02 mass %, and lithium-metal composite oxide particles making up the remainder. The lithium-metal composite oxide particles contain nickel (Ni) in an amount not lower than 60 mol % of the total amount of metallic elements. At least a partial amount of each of the fluorine and the carbon is present on surfaces of the lithium-metal composite oxide particles.

The positive electrode active material according to the present disclosure is a Ni-rich positive electrode active material. More specifically, the lithium-metal composite oxide particles (hereinafter, also called "LiMeO particles") contain Ni in an amount not lower than 60 mol %. Onto surfaces of the LiMeO particles, fluorine (F) has been introduced. The fluorine (F) introduction may mitigate alkaline component formation. It may be because the F introduction stabilizes the valence of Ni that is present on or near the surfaces of the LiMeO particles. The F content is not lower than 0.08 mass %. In the configuration in which the F content is lower than 0.08 mass %, alkaline component formation may not be sufficiently mitigated.

The F introduction onto the surfaces of the LiMeO particles tends to cause an increase in resistance. In order to address this problem, the positive electrode active material according to the present disclosure has carbon (C), in addition to F, introduced onto surfaces of the LiMeO particles. With the amount of C present on surfaces of the LiMeO particles being not lower than 0.02 mass %, an increase in resistance attributable to F introduction may be mitigated.

[2] The positive electrode active material may contain fluorine in an amount not higher than 0.61 mass %.

With the F content being not higher than 0.61 mass %, resistance may be decreased. It may be because the moderately low F content reduces potential damage caused to the crystal structure by F introduction.

[3] The lithium-metal composite oxide particles may have a composition represented by the following formula (I):

$$LiNi_xCo_yAl_zO_2 \qquad (I)$$

where x, y, and z satisfy the following relations:

$$0.6 \leq x \leq 0.9;$$

$$x+y+z=1; \text{ and}$$

$$y \geq z.$$

The LiMeO particles represented by the above formula (I) may have a relatively stable crystal structure.

[4] The lithium-metal composite oxide particles may contain nickel in an amount not lower than 80 mol % of the total amount of metallic elements.

The higher the Ni content in the Ni-rich positive electrode active material is, the higher the capacity may be. However, the higher the Ni content is, the higher the amount of alkaline component formation tends to be. The positive electrode active material according to the present disclosure may exhibit a particularly great effect of mitigating alkaline component formation when the Ni content is not lower than 80 mol %.

[5] The positive electrode according to the present disclosure includes at least the positive electrode active material according to any one of [1] to [4] above.

Production of the positive electrode according to the present disclosure may proceed stably. It may be because a paste used as a precursor of the positive electrode has a long pot life. The positive electrode according to the present disclosure may also have a desired degree of resistance. It may be because an increase in resistance attributable to F introduction into the positive electrode active material is mitigated.

[6] The lithium-ion secondary battery according to the present disclosure includes at least the positive electrode according to [5] above.

The lithium-ion secondary battery according to the present disclosure may have a high capacity. It may be because the positive electrode contains the Ni-rich positive electrode active material.

[7] A method of producing a positive electrode active material according to the present disclosure is a method of producing a positive electrode active material for a lithium-ion secondary battery. The method of producing a positive electrode active material according to the present disclosure includes at least the following (a) to (c):

(a) preparing lithium-metal composite oxide particles;

(b) mixing the lithium-metal composite oxide particles with a fluorocarbon material to prepare a mixture; and (c) heating the mixture in an inert atmosphere to produce the positive electrode active material.

The lithium-metal composite oxide particles contain nickel in an amount not lower than 60 mol % of the total amount of metallic elements. The content of the fluorocarbon material in the mixture is determined so that the positive electrode active material contains at least fluorine in an amount not lower than 0.08 mass %, carbon in an amount not lower than 0.02 mass %, and lithium-metal composite oxide particles making up the remainder.

By the method of producing a positive electrode active material according to the present disclosure, the positive electrode active material according to [1] above may be produced. In the method of producing a positive electrode active material according to the present disclosure, a fluorocarbon material is used as both the F source and the C source. Using a fluorocarbon material may allow efficient introduction of F and C onto surfaces of the LiMeO particles.

Using a fluorocarbon material (as both the F source and the C source), compared to separately adding the F source and the C source, may also allow F and C to be closely positioned to each other on a surface of the positive electrode active material. As a result, an increase in resistance attributable to F introduction may be efficiently mitigated.

[8] The fluorocarbon material may be polytetrafluoroethylene. The mixture may be heated at a temperature not lower than a temperature at which polytetrafluoroethylene breaks down to produce the positive electrode active material.

Polytetrafluoroethylene (PTFE) contains F and C in a preferable composition ratio. When PTFE is used, each of the F content and the C content in the positive electrode active material may be controlled to fall within a preferable range.

[9] In the method of producing a positive electrode active material according to [8] above, the mixture may contain polytetrafluoroethylene in an amount not lower than 0.1 mass % of the amount of the mixture.

With the mixture (a precursor of the positive electrode active material) containing PTFE in an amount not lower than 0.10 mass %, the positive electrode active material after heating may contain F in an amount not lower than 0.08 mass % and C in an amount not lower than 0.02 mass %.

[10] In the method of producing a positive electrode active material according to [8] or [9] above, the mixture may contain polytetrafluoroethylene in an amount not higher than 0.80 mass % of the amount of the mixture.

With the mixture containing PTFE in an amount not higher than 0.80 mass %, the positive electrode active material after heating may contain F in an amount not higher than 0.61 mass %.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
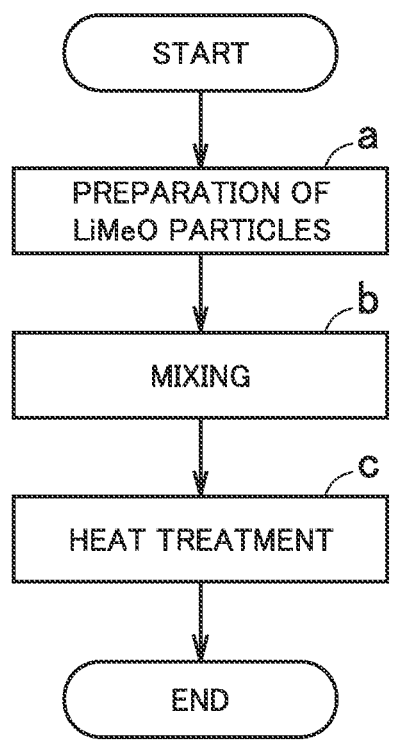
FIG. 1 is a flow chart schematically illustrating the method of producing a positive electrode active material according to the present embodiment.

In the following, embodiments according to the present disclosure (herein called "present embodiment") are described. The description below does not limit the scope of claims.

<Positive Electrode Active Material>

A positive electrode active material according to the present embodiment is a positive electrode active material for a lithium-ion secondary battery. The lithium-ion secondary battery is described below in detail. The positive electrode active material is a group of particles (powder). The positive electrode active material contains at least (i) F in an amount not lower than 0.08 mass %, (ii) C in an amount not lower than 0.02 mass %, and (iii) LiMeO particles making up the remainder.

<<Lithium-Metal Composite Oxide Particles>>

Lithium-metal composite oxide particles (LiMeO particles) are a base material of the positive electrode active material. If F and C are removed from the positive electrode active material, the remainder is made up of the LiMeO particles. The LiMeO particles may have a D50 not lower than 1 μm and not higher than 30 μm, for example. The D50 refers to the particle size in volume-based particle size distribution at which the cumulative particle volume (accumulated from the side of small sizes) reaches 50% of the total particle volume. The D50 may be measured with a laser-diffraction particle size distribution analyzer, for example.

In each LiMeO particle, the host structure is made of a metal oxide (MeO). Li ions are the guest ions. As a result of Li ions coming in and out of the host structure (more specifically, as a result of intercalation of Li ions), electrons are transferred. The LiMeO particle may have any crystal structure. The LiMeO particle may have a crystal structure of a lamellar rock salt type, for example. The crystal structure of the LiMeO particle may be identified in an X-ray diffraction (XRD) pattern, for example.

The positive electrode active material according to the present embodiment is a Ni-rich positive electrode active material. More specifically, the LiMeO particles contain Ni in an amount not lower than 60 mol % of the total amount of metallic elements. Each of the Ni content and the composition of the LiMeO particles may be determined by a conventionally known method. Each of the Ni content and the composition of the LiMeO particles may be measured by inductively coupled plasma-atomic emission spectrometry (ICP-AES), for example. Measurement of each of the Ni content and the composition of the LiMeO particles is carried out at least three times. The arithmetic mean of these at least three measurements is used.

The "metallic element" herein includes a metalloid element (such as boron (B), silicon (Si), and germanium (Ge)).

With Ni contained in an amount not lower than 60 mol %, a high capacity may be obtained. The LiMeO particles may contain Ni in an amount not lower than 80 mol % of the total amount of metallic elements. With Ni contained in an amount not lower than 80 mol %, an even higher capacity may be obtained. The metallic elements contained in the LiMeO particles may consist essentially of Ni. In other words, the composition of the LiMeO particles may be represented by $LiNiO_2$.

As long as Ni is contained in an amount not lower than 60 mol %, the LiMeO particles may further contain a metallic element other than Ni. The metallic element other than Ni may be, for example, a transition metal element such as cobalt (Co) and manganese (Mn) and/or a main group metal element such as aluminum (Al).

The composition of the LiMeO particles may be represented by, for example, the following formula (I):

$$LiNi_xCo_yAl_zO_2 \qquad (I)$$

where x, y, and z satisfy the following relations:

$$0.6 \leq x \leq 0.9;$$

$$x+y+z=1;\text{ and}$$

$$y \geq z.$$

The LiMeO particles represented by the above formula (I) may have a relatively stable crystal structure. The stable crystal structure of the LiMeO particles may lead to, for example, improvement in cycle durability. In the above formula (I), x may satisfy $0.7 \leq x \leq 0.9$, for example; x may satisfy $0.8 \leq x \leq 0.9$, for example; and y may satisfy $0.05 \leq y \leq 0.35$, for example.

<<Fluorine and Carbon>>

At least a partial amount of each of the fluorine (F) and the carbon (C) according to the present embodiment may be present on surfaces of the LiMeO particles. The presence of F on surfaces of the LiMeO particles may mitigate alkaline component formation. In addition, the presence of both F and C on surfaces of the LiMeO particles may mitigate an increase in resistance attributable to F introduction.

The entire amount of F may be present on surfaces of the LiMeO particles. A partial amount of F may be diffused within the LiMeO particles. The entire amount of C may be present on surfaces of the LiMeO particles. A partial amount of C may be diffused within the LiMeO particles. The distribution of F and C may be checked by, for example, scanning transmission electron microscope-electron energy loss spectroscopy (STEM-EELS) of a cross section of the LiMeO particle. Regarding the term "surfaces of the LiMeO particles", a surface of each LiMeO particle refers to the part of the LiMeO particle that stretches for 100 nm from the outermost surface of the particle in a direction, for example, toward the center of the particle.

The relation of F and C to the LiMeO particle is not particularly limited. For example, each of F and C may be chemically bound to the LiMeO particle. For example, each of F and C may be a substituent that replaces a part of the host structure of the LiMeO particle. In other words, a substitutional solid solution may be present on a surface of the LiMeO particle. For example, each of F and C may occupy an interstitial position in the host structure of the LiMeO particle. In other words, an interstitial solid solution may be present on a surface of the LiMeO particle. For example, F and C may be chemically bound to each other.

The F content refers to the ratio of F to the entire positive electrode active material. The F content is not lower than 0.08 mass %. With the F content being not lower than 0.08 mass %, alkaline component formation may be mitigated. It may be because the F introduction stabilizes the valence of Ni that is present on or near the surfaces of the LiMeO particles. The F content may be measured by a conventionally known method. For example, the F content may be measured by ion chromatography. Measurement of the F content is carried out at least three times. The arithmetic mean of these at least three measurements is used.

The F content may be not lower than 0.23 mass %, for example. With such a F content, alkaline component formation may be mitigated. The upper limit to the F content is not particularly limited. The F content may be not higher than 0.76 mass %, for example. The F content may be not higher than 0.68 mass %, for example.

The F content may be not higher than 0.61 mass %, for example. With such a F content, resistance may be decreased. It may be because the moderately low F content reduces potential damage caused to the crystal structure. The F content may be not higher than 0.53 mass %, for example. With such a F content, resistance may be decreased.

The C content refers to the ratio of C to the entire positive electrode active material. The C content is not lower than 0.02 mass %. With the C content being not lower than 0.02 mass %, an increase in resistance attributable to F introduction may be mitigated. The C content may be measured by a conventionally known method. For example, the C content may be measured by an infrared absorption method after combustion. Measurement of the C content is carried out at least three times. The arithmetic mean of these at least three measurements is used.

The C content may be not lower than 0.07 mass %, for example. With such a C content, an increase in resistance may be mitigated. The upper limit to the C content is not particularly limited. The C content may be not higher than 0.24 mass %, for example. The C content may be not higher than 0.22 mass %, for example. The C content may be not higher than 0.19 mass %, for example. With such a C content, a decrease in the mass capacity density of the positive electrode active material may be mitigated. The C content may be not higher than 0.17 mass %, for example. With such a C content, a decrease in the mass capacity density of the positive electrode active material may be mitigated.

<<Additional Component>>

As long as the positive electrode active material contains the components described above, the positive electrode active material may further contain an additional component. Examples of the additional component include zirconium (Zr), molybdenum (Mo), tungsten (W), magnesium (Mg), calcium (Ca), sodium (Na), iron (Fe), chromium (Cr), zinc (Zn), boron (B), silicon (Si), tin (Sn), sulfur (S), and phosphorus (P).

For example, the additional component may be a substituent that replaces a part of the host structure of a LiMeO particle. For example, the additional component may be adhered to a surface of a LiMeO particle. For example, the additional component may be in oxide form (such as $WO_3$)

adhered to a surface of a LiMeO particle. The positive electrode active material may contain only one type of the additional component. The positive electrode active material may contain two or more types of the additional component. The content of the additional component may be, for example, not lower than 0.1 mol % and not higher than 5 mol % of the total amount of metallic elements and the additional component.

<Method of Producing Positive Electrode Active Material>

Next, the method of producing a positive electrode active material according to the present embodiment is described.

FIG. 1 is a flow chart schematically illustrating the method of producing a positive electrode active material according to the present embodiment.

The method of producing a positive electrode active material according to the present embodiment includes at least "(a) preparation of LiMeO particles", "(b) mixing", and "(c) heat treatment".

<<(a) Preparation of LiMeO Particles>>

The method of producing a positive electrode active material according to the present embodiment includes preparing LiMeO particles. The LiMeO particles are described above in detail. More specifically, the LiMeO particles contain Ni in an amount not lower than 60 mol % of the total amount of metallic elements.

Preparation of the LiMeO particles may be carried out by synthesizing the LiMeO particles. An example process is described below. A precursor may be prepared by alkaline coprecipitation. The precursor is mixed with a lithium compound, and thus a mixture is prepared. The mixture is subjected to heat treatment, and thus a calcined product is obtained. The calcined product is pulverized, and thus the LiMeO particles may be prepared. Alternatively, preparation of the LiMeO particles may be carried out by purchasing commercially available LiMeO particles.

<<(b) Mixing>>

The method of producing a positive electrode active material according to the present embodiment includes mixing the LiMeO particles with a fluorocarbon material to prepare a mixture. In the method of producing a positive electrode active material according to the present embodiment, the content of the fluorocarbon material in the mixture is determined so that the positive electrode active material (final product) contains at least F in an amount not lower than 0.08 mass %, C in an amount not lower than 0.02 mass %, and the LiMeO particles making up the remainder.

The "fluorocarbon material" refers to a material containing both F and C in which F and C are chemically bound to each other. Using a fluorocarbon material, compared to separately adding the F source and the C source, may allow F and C to be closely positioned to each other on a surface of the positive electrode active material. As a result, an increase in resistance attributable to F introduction may be efficiently mitigated.

The fluorocarbon material may be in powder (solid) form, for example. The fluorocarbon material may be in liquid form. The fluorocarbon material may be in gaseous form. When the fluorocarbon material is in powder form, the D50 of the fluorocarbon material may be lower than the D50 of the LiMeO particles. This configuration may achieve, for example, uniform introduction of F and C onto the entire surface of each LiMeO particle.

In the mixing process, a typical stirrer or the like may be used. The mixing process may be dry mixing. "Dry mixing" refers to mixing solid materials in the practical absence of liquid. The mixing process may be wet mixing. "Wet mixing" refers to mixing solid materials in the co-presence of liquid.

The fluorocarbon material may be a material consisting essentially of F and C. The fluorocarbon material may be a fluorocarbon (such as a carbon tetrafluoride), graphite fluoride, and/or a fluorocarbon resin, for example. The fluorocarbon resin may be PTFE, polyvinyl fluoride (PVF), and/or polyvinylidene difluoride (PVdF), for example. Only one type of the fluorocarbon material may be used. Two or more types of the fluorocarbon material may be used in combination.

The fluorocarbon material may be PTFE. PTFE contains F and C in a preferable composition ratio. When the fluorocarbon material is PTFE, PTFE may be contained in the mixture in an amount, for example, not lower than 0.10 mass % of the amount of the mixture (namely, the total amount of the LiMeO particles and PTFE). In this configuration, the positive electrode active material after heating (final product) may contain F in an amount not lower than 0.08 mass % and C in an amount not lower than 0.02 mass %. The PTFE content may be, for example, not lower than 0.3 mass % of the amount of the mixture.

The mixture may contain PTFE in an amount not higher than 0.80 mass % of the amount of the mixture. With PTFE contained in such an amount, the positive electrode active material after heating may contain F in an amount not higher than 0.61 mass %. The PTFE content may be, for example, not higher than 0.7 mass % of the amount of the mixture.

<<(c) Heat Treatment>>

The method of producing a positive electrode active material according to the present embodiment includes heating the mixture (obtained in the above process) in an inert atmosphere to produce the positive electrode active material.

In the heat treatment, an atmosphere-controllable heat treatment furnace is used. The inert atmosphere may be an argon (Ar) atmosphere, for example. The heat treatment is carried out at a temperature that may allow introduction of F and C onto surfaces of the LiMeO particles. The temperature for the heat treatment may be, for example, equal to or higher than the temperature at which the fluorocarbon material breaks down. Desirably, the temperature for the heat treatment is selected so that the heat treatment has little influence on the LiMeO particle crystal structure and the like.

For example, the temperature for the heat treatment may be not lower than 400° C. and not higher than 550° C. It should be noted that the temperature at which PTFE breaks down may be about 390° C. This means that when the fluorocarbon material is PTFE, the mixture may be heated at a temperature equal to or higher than the temperature at which PTFE breaks down to produce the positive electrode active material. The duration of the heat treatment may be not shorter than 0.5 hour and not longer than 10 hours, for example. In this way, the positive electrode active material according to the present embodiment may be produced.

<Lithium-Ion Secondary Battery>

Next, the lithium-ion secondary battery according to the present embodiment and a positive electrode according to the present embodiment are described. Hereinafter, the lithium-ion secondary battery may be simply referred to as "battery".

Figure 2:
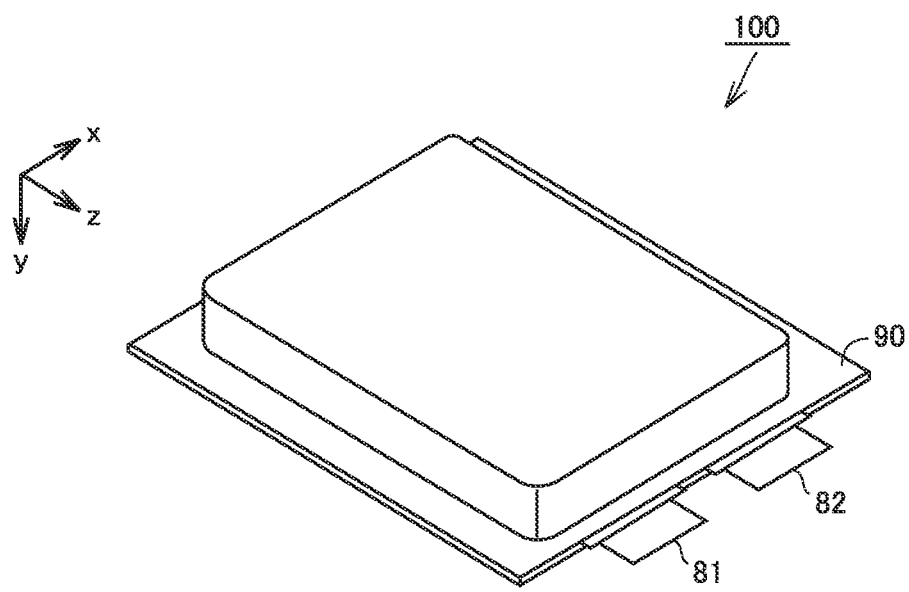
FIG. 2 is a first schematic view illustrating the structure of the lithium-ion secondary battery according to the present embodiment.

FIG. 2 is a first schematic view illustrating the structure of the lithium-ion secondary battery according to the present embodiment.

A battery 100 is a lithium-ion secondary battery. Battery 100 includes a housing 90. Housing 90 is a pouch made of an aluminum-laminated film. In other words, battery 100 is a laminate-type battery. Alternatively, housing 90 may be made of metal. Battery 100 may be a prismatic battery or a cylindrical battery, for example. Housing 90 is hermetically sealed. A positive electrode tab 81 and a negative electrode tab 82 are provided to allow for communication between inside and outside housing 90.

Figure 3:
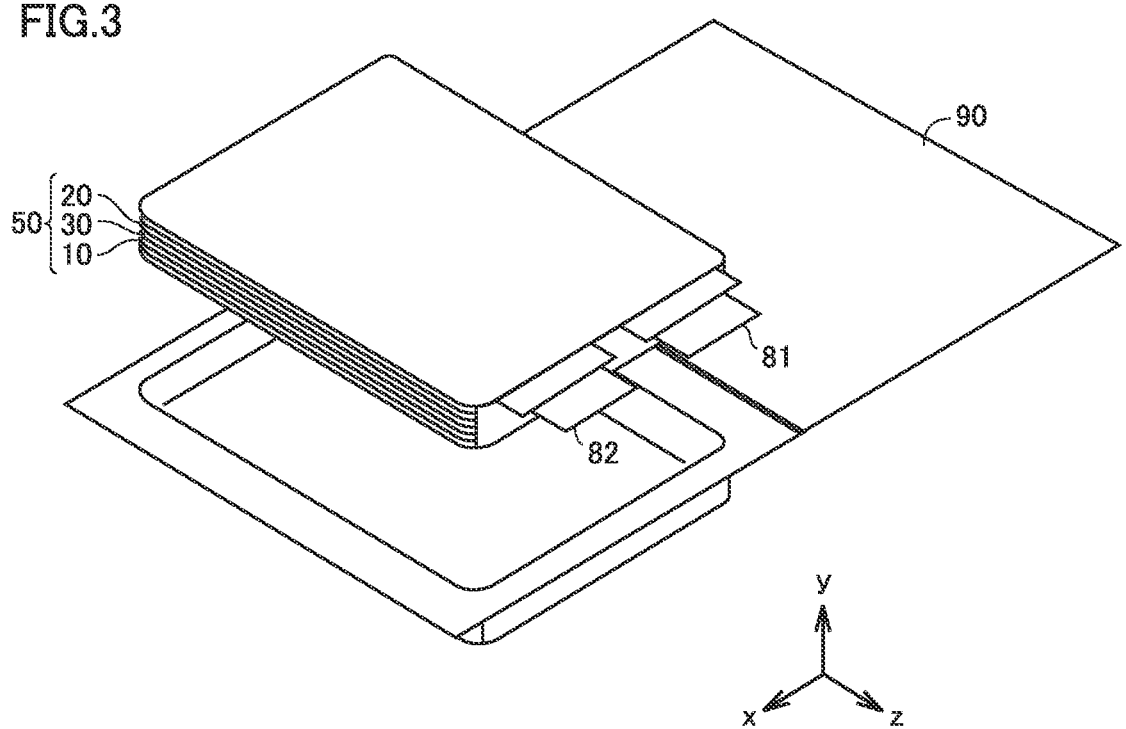
FIG. 3 is a second schematic view illustrating the structure of the lithium-ion secondary battery according to the present embodiment.

FIG. 3 is a second schematic view illustrating the structure of the lithium-ion secondary battery according to the present embodiment.

The edges of housing 90 are heat sealed and thereby housing 90 is hermetically sealed. Housing 90 accommodates an electrode array 50 and an electrolyte (not shown). Electrode array 50 is a stack-type one. Electrode array 50 is formed by alternately stacking one positive electrode 10 and one negative electrode 20 and then repeating this alternate stacking process more than once. In other words, battery 100 includes at least positive electrode 10. In each space between positive electrode 10 and negative electrode 20, a separator 30 is interposed. Each positive electrode 10 is electrically connected to positive electrode tab 81. Each negative electrode 20 is electrically connected to negative electrode tab 82.

Electrode array 50 may be a wound-type one. More specifically, electrode array 50 may be formed by stacking positive electrode 10, separator 30, and negative electrode 20 in this order and then winding them in a spiral fashion.

<<Positive Electrode>>

Positive electrode 10 is in sheet form. Positive electrode 10 includes at least the positive electrode active material according to the present embodiment. The positive electrode active material according to the present embodiment is described above in detail. Positive electrode 10 includes the positive electrode active material according to the present embodiment (Ni-rich positive electrode active material), and therefore battery 100 may have a high capacity. As long as positive electrode 10 includes the positive electrode active material according to the present embodiment, positive electrode 10 may further include an additional positive electrode active material (such as LiMeO particles with a Ni content lower than 60 mol % as well as $LiFePO_4$ particles).

Positive electrode 10 may include a positive electrode current collector and a positive electrode active material layer, for example. The positive electrode active material layer may contain the positive electrode active material. The positive electrode current collector may be an Al foil, for example. The positive electrode current collector may have a thickness not smaller than 5 μm and not greater than 30 μm, for example. The positive electrode active material layer may be formed on a surface of the positive electrode current collector. The positive electrode active material layer may be formed by, for example, applying a paste containing the positive electrode active material to a surface of the positive electrode current collector and then drying the paste. The positive electrode active material layer may be formed on both sides of the positive electrode current collector. The positive electrode active material layer may have a thickness not smaller than 10 μm and not greater than 200 μm, for example.

The positive electrode active material layer contains at least the positive electrode active material. The positive electrode active material layer may contain the positive electrode active material, a conductive material, and a binder, for example. The conductive material is not particularly limited. The conductive material may be acetylene black (AB), carbon short fibers, and/or graphite, for example. The content of the conductive material may be, for example, not lower than 0.1 part by mass and not higher than 10 parts by mass relative to 100 parts by mass of the positive electrode active material. The binder is not particularly limited. The binder may be PVdF, for example. The content of the binder may be, for example, not lower than 0.1 part by mass and not higher than 10 parts by mass relative to 100 parts by mass of the positive electrode active material.

Typically, PVdF tends to degrade in the presence of an alkaline component. When containing degraded PVdF, the paste may be difficult to apply (thereby positive electrode 10 may be difficult to produce). In addition, degraded PVdF may affect battery performance. In the present embodiment, alkaline component formation may be mitigated and thereby degradation of PVdF, if used as the binder, may also be sufficiently mitigated.

<<Negative Electrode>>

Negative electrode 20 is in sheet form. Negative electrode 20 may include a negative electrode current collector and a negative electrode active material layer, for example. The negative electrode current collector may be made of a copper (Cu) foil, for example. The negative electrode current collector may have a thickness not smaller than 5 μm and not greater than 30 μm, for example. The negative electrode active material layer may be formed on a surface of the negative electrode current collector. The negative electrode active material layer may be formed on both sides of the negative electrode current collector. The negative electrode active material layer may have a thickness not smaller than 10 μm and not greater than 200 μm, for example.

The negative electrode active material layer contains at least a negative electrode active material. The negative electrode active material layer may contain the negative electrode active material and a binder, for example. The negative electrode active material may be graphite, soft carbon, hard carbon, silicon, silicon oxide, silicon-based alloy, tin, tin oxide, the metal lithium, and/or lithium alloy, for example. The negative electrode active material layer may contain only one type of the negative electrode active material. The negative electrode active material layer may contain two or more types of the negative electrode active material.

The binder is not particularly limited. The binder may be carboxymethylcellulose (CMC) and/or styrene-butadiene rubber (SBR), for example. The content of the binder may be, for example, not lower than 0.1 part by mass and not higher than 10 parts by mass relative to 100 parts by mass of the negative electrode active material.

<<Separator>>

Separator 30 is electrically insulating. Separator 30 is interposed between positive electrode 10 and negative electrode 20. Separator 30 separates positive electrode 10 and negative electrode 20 from each other. Separator 30 is a porous film. Separator 30 may have a thickness not smaller than 10 μm and not greater than 30 μm, for example. Separator 30 may be a porous polyolefin film, for example. In the configuration in which the electrolyte (described below) is a solid electrolyte, separator 30 may be practically unnecessary.

Separator 30 may have a monolayer structure. Separator 30 may consist of a porous polyethylene (PE) film, for example. Separator 30 may have a multilayer structure (such as a three-layer structure). Separator 30 may be formed by, for example, stacking a porous polypropylene (PP) film, a porous PE film, and a porous PP film in this order. Separator 30 may have a heat-resistant film on a surface thereof. The heat-resistant film contains a heat-resistant material. The heat-resistant material may be boehmite, for example.

<<Electrolyte>>

The electrolyte is a lithium-ion conductor. The electrolyte may be a liquid electrolyte, for example. The electrolyte may be a gelled electrolyte, for example. The electrolyte may be a solid electrolyte, for example. The liquid electrolyte may be an electrolyte solution or an ionic liquid, for example. In the present specification, the electrolyte in the form of electrolyte solution is described as an example.

The electrolyte solution contains at least a supporting salt and a solvent. The supporting salt is dissolved in the solvent. The concentration of the supporting salt may be not lower than 0.5 mol/L and not higher than 2 mol/L (not lower than 0.5 M and not higher than 2 M), for example. The supporting salt may be $LiPF_6$, $Li[N(FSO_2)_2]$, and/or $Li[N(CF_3SO_2)_2]$, for example. The electrolyte solution may contain only one type of the supporting salt. The electrolyte solution may contain two or more types of the supporting salt.

The solvent is aprotic. The solvent may be a mixture of a cyclic carbonate and a chain carbonate, for example. The mixing ratio may be, for example, "(cyclic carbonate):(chain carbonate)=1:9 to 5:5 (volume ratio)".

The cyclic carbonate may be ethylene carbonate (EC), propylene carbonate (PC), butylene carbonate (BC), and/or fluoroethylene carbonate (FEC), for example. The solvent may contain only one type of the cyclic carbonate. The solvent may contain two or more types of the cyclic carbonate.

The chain carbonate may be dimethyl carbonate (DMC), ethyl methyl carbonate (EMC), and/or diethyl carbonate (DEC), for example. The solvent may contain only one type of the chain carbonate. The solvent may contain two or more types of the chain carbonate.

The solvent may contain a lactone, a cyclic ether, a chain ether, and/or a carboxylate ester, for example. The lactone may be γ-butyrolactone (GBL) and/or δ-valerolactone, for example. The cyclic ether may be tetrahydrofuran (THF), 1,3-dioxolane, and/or 1,4-dioxane, for example. The chain ether may be 1,2-dimethoxyethane (DME), for example. The carboxylate ester may be methyl formate (MF), methyl acetate (MA), and/or methyl propionate (MP), for example.

The electrolyte solution may further contain various additives in addition to the supporting salt and the solvent. The electrolyte solution may contain the additives in an amount not lower than 0.005 mol/L and not higher than 0.5 mol/L, for example. Examples of the additives include a gas generation agent (also called "anti-overcharging additive"), a solid electrolyte interface (SEI) film-forming agent, and a flame retardant. The gas generation agent may be cyclohexylbenzene (CHB) and/or biphenyl (BP), for example. The SEI-film-forming agent may be vinylene carbonate (VC), vinylethylene carbonate (VEC), $Li[B(C_2O_4)_2]$, $LiPO_2F_2$, propane sultone (PS), and/or ethylene sulfite (ES), for example. The flame retardant may be a phosphoric acid ester and/or a phosphazene, for example.

EXAMPLES

Next, examples according to the present disclosure are described. The description below does not limit the scope of claims.

<Experiment 1>

In an Experiment 1, influence of the F content and the C content was studied.

<<Production of Positive Electrode Active Material>>

Example 1-1

1. (a) Preparation of LiMeO Particles

As LiMeO particles, $LiNi_{0.8}Co_{0.15}Al_{0.05}O_2$ (powder) was prepared. The LiMeO particles contained Ni in an amount of 80 mol % of the total amount of metallic elements.

2. (b) Mixing

As a fluorocarbon material, PTFE (powder) was prepared. The LiMeO particles and the fluorocarbon material were dry mixed, and thus a mixture was prepared. The resulting mixture contained 0.1 mass % PTFE.

3. (c) Heat Treatment

The mixture was heated in an Ar atmosphere. The temperature for the heat treatment was 550° C. Thus, a positive electrode active material according to Example 1-1 was produced. Based on the difference between the mass of the positive electrode active material and the mass of the LiMeO particles (namely, the increment in mass) as well as the composition ratio between F and C in PTFE, it is considered that the positive electrode active material may have contained 0.08 mass % F, 0.02 mass % C, and the LiMeO particles making up the remainder. Both F and C may have been present on surfaces of the LiMeO particles.

Examples 1-2 to 1-6

A positive electrode active material was produced in the same manner as in Example 1-1 except that the content of the fluorocarbon material in the mixture was changed as specified in Table 1 below.

Comparative Example 1-1

The LiMeO particles alone were heated in an Ar atmosphere. The temperature for the heat treatment was 550° C. Thus, a positive electrode active material was produced.

Comparative Example 1-2

A positive electrode active material was produced in the same manner as in Example 1-1 except that the content of the fluorocarbon material in the mixture was changed as specified in Table 1 below.

Reference Example 1

As the F source, ammonium fluoride ($NH_4F$) was prepared. $NH_4F$ is a F source without C. The LiMeO particles and $NH_4F$ (powder) were dry mixed, and thus a mixture was prepared. The resulting mixture contained 10 mass % $NH_4F$. The mixture was heated in an Ar atmosphere. The temperature for the heat treatment was 400° C. Thus, a positive electrode active material according to Reference Example 1 was produced.

Reference Examples 2 to 7

A positive electrode active material was produced in the same manner as in Reference Example 1 except that the content of the F source in the mixture was changed as specified in Table 1 below.

<<Evaluation>>
1. Paste Storage Test
The materials described below were prepared.
Conductive material: AB
Binder: PVdF
Solvent: N-methyl-2-pyrrolidone
The positive electrode active material, the conductive material, the binder, and the solvent were mixed, and thus a paste was prepared. The resulting paste was stored in the atmosphere for one day. After the one-day storage, the viscosity of the paste (hereinafter, also called "post-storage viscosity") was measured. Results are shown in Table 1 below. Each value in column "Viscosity" in Table 1 below is expressed as a percentage; the value is obtained by dividing the post-storage viscosity of each example by the post-storage viscosity of Comparative Example 1-1 and then converting the resultant into percentage. The lower the value is, the greater the mitigation of alkaline component formation may have been.

2. Production of Lithium-Ion Secondary Battery
Positive electrode 10 including the positive electrode active material was produced, and then battery 100 including positive electrode 10 (lithium-ion secondary battery) was produced. The configurations of positive electrode 10 and battery 100 are described below.

(Positive Electrode)
Positive electrode active material layer: [(positive electrode active material):(conductive material):binder=94:3:3 (mass ratio)]
Conductive material: AB
Binder: PVdF
Positive electrode current collector: Al foil (15 μm in thickness)

(Negative Electrode)
Negative electrode active material layer: [(negative electrode active material):binder=98:2]
Negative electrode active material: graphite
Binder: [CMC:SBR=1:1]
Negative electrode current collector: Cu foil (10 μm in thickness)

(Electrolyte Solution)
Supporting salt: $LiPF_6$ (1 mol/L in concentration)
Solvent: [EC:DMC:EMC=3:3:4 (volume ratio)]
(Separator)
Porous PE film (monolayer) (10 μm in thickness)
(Housing)
A pouch made of an aluminum-laminated film 3. Discharge Test
The state of charge (SOC) of battery 100 was adjusted to 50% in an environment at room temperature. In an environment at a temperature of −10° C., battery 100 was discharged at a current of 1 C for ten seconds. At a current of 1 C, discharging battery 100 from its rated capacity completes in one hour. The level of voltage drop caused in that ten seconds elapsed after the start of the discharging was measured. The resulting value of the level of voltage drop was divided by the amount of the discharge current, and thus the direct-current resistance (also called "IV resistance") was calculated. Results are shown in Table 1 below. Each value in column "Resistance" in Table 1 below is expressed as a percentage; the value is obtained by dividing the direct-current resistance of each example by the direct-current resistance of Comparative Example 1-1 and then converting the resultant into percentage. The lower the value is, the greater the mitigation of an increase in resistance may have been.

4. Cycle Test
100 cycles of charge and discharge were carried out at a current of 2 C in an environment at a temperature of 60° C. within the SOC range from 0% to 100%. The capacity loss rate was calculated by the following equation:

Capacity loss rate [%]={1−((discharged capacity measured after 100th cycle)/(discharged capacity measured after 1st cycle))}×100.

Results are shown in Table 1 below. Each value in column "Capacity loss rate" in Table 1 below is expressed as a percentage; the value is obtained by dividing the capacity loss rate of each example by the capacity loss rate of Comparative Example 1-1 and then converting the resultant into percentage. The lower the value is, the better the cycle durability may have been.

TABLE 1

Experiment 1

| | Method of producing positive electrode active material | | | | | | Positive electrode active material | | Paste storage test | Discharge test | Cycle test |
|---|---|---|---|---|---|---|---|---|---|---|---|
| | (a) Preparation of LiMeO particles | | (b) Mixing Fluorocarbon material | | (c) Heat treatment | | | | | | Capacity |
| | | Ni content | (F source) | | | | F | C | | Resistance | loss rate |
| | Composition | (Ni/Me) mol % | Type | Content mass % | Atmosphere | Temp. ° C. | content mass % | content mass % | Viscosity* % | % | % |
| Comp. Ex. 1-1 | $LiNi_{0.8}Co_{0.15}Al_{0.05}O_2$ | 80 | — | — | Ar | 550 | 0 | 0 | 100 | 100 | 100 |
| Comp. Ex. 1-2 | $LiNi_{0.8}Co_{0.15}Al_{0.05}O_2$ | 80 | PTFE | 0.05 | Ar | 550 | 0.04 | 0.01 | 98 | 101 | 100 |
| Ex. 1-1 | $LiNi_{0.8}Co_{0.15}Al_{0.05}O_2$ | 80 | PTFE | 0.10 | Ar | 550 | 0.08 | 0.02 | 72 | 88 | 100 |
| Ex. 1-2 | $LiNi_{0.8}Co_{0.15}Al_{0.05}O_2$ | 80 | PTFE | 0.30 | Ar | 550 | 0.23 | 0.07 | 32 | 82 | 100 |
| Ex. 1-3 | $LiNi_{0.8}Co_{0.15}Al_{0.05}O_2$ | 80 | PTFE | 0.70 | Ar | 550 | 0.53 | 0.17 | 32 | 83 | 100 |
| Ex. 1-4 | $LiNi_{0.8}Co_{0.15}Al_{0.05}O_2$ | 80 | PTFE | 0.80 | Ar | 550 | 0.61 | 0.19 | 31 | 92 | 100 |
| Ex. 1-5 | $LiNi_{0.8}Co_{0.15}Al_{0.05}O_2$ | 80 | PTFE | 0.90 | Ar | 550 | 0.68 | 0.22 | 32 | 113 | 103 |
| Ex. 1-6 | $LiNi_{0.8}Co_{0.15}Al_{0.05}O_2$ | 80 | PTFE | 1.00 | Ar | 550 | 0.76 | 0.24 | 32 | 138 | 120 |
| Ref. Ex. 1 | $LiNi_{0.8}Co_{0.15}Al_{0.05}O_2$ | 80 | $NH_4F$ | 0.07 | Ar | 400 | 0.04 | 0 | 93 | 107 | 109 |
| Ref. Ex. 2 | $LiNi_{0.8}Co_{0.15}Al_{0.05}O_2$ | 80 | $NH_4F$ | 0.15 | Ar | 400 | 0.08 | 0 | 65 | 117 | 114 |
| Ref. Ex. 3 | $LiNi_{0.8}Co_{0.15}Al_{0.05}O_2$ | 80 | $NH_4F$ | 0.45 | Ar | 400 | 0.23 | 0 | 31 | 135 | 134 |
| Ref. Ex. 4 | $LiNi_{0.8}Co_{0.15}Al_{0.05}O_2$ | 80 | $NH_4F$ | 1.04 | Ar | 400 | 0.53 | 0 | 30 | 204 | 156 |

TABLE 1-continued

Experiment 1

Method of producing positive electrode active material

| | (a) Preparation of LiMeO particles | | (b) Mixing Fluorocarbon material (F source) | | (c) Heat treatment | | Positive electrode active material | | Paste storage test | Discharge test | Cycle test |
| --- | --- | --- | --- | --- | --- | --- | --- | --- | --- | --- | --- |
| | | Ni content (Ni/Me) mol % | Type | Content mass % | Atmosphere | Temp. ° C. | F content mass % | C content mass % | Viscosity* % | Resistance % | Capacity loss rate % |
| | Composition | | | | | | | | | | |
| Ref. Ex. 5 | LiNi$_{0.8}$Co$_{0.15}$Al$_{0.05}$O$_2$ | 80 | NH$_4$F | 1.19 | Ar | 400 | 0.61 | 0 | 31 | 253 | 178 |
| Ref. Ex. 6 | LiNi$_{0.8}$Co$_{0.15}$Al$_{0.05}$O$_2$ | 80 | NH$_4$F | 1.34 | Ar | 400 | 0.68 | 0 | 30 | 274 | 203 |
| Ref. Ex. 7 | LiNi$_{0.8}$Co$_{0.15}$Al$_{0.05}$O$_2$ | 80 | NH$_4$F | 1.49 | Ar | 400 | 0.76 | 0 | 31 | 348 | 223 |

*Each value is expressed as a percentage; the value is obtained by dividing the post-storage viscosity of each example by the post-storage viscosity of Comparative Example 1-1 and then converting the resultant into percentage.

<<Results>>

In Examples 1-1 to 1-6, compared to Comparative Example 1-1, the post-storage viscosity of the paste was low (as shown in Table 1 above); in other words, an increase in viscosity of the paste was mitigated. It may be because alkaline component formation was mitigated by F introduction. In Examples 1-1 to 1-6, the F content in the positive electrode active material was not lower than 0.08 mass %.

In Comparative Example 1-2, no effect of mitigating alkaline component formation was observed. In Comparative Example 1-2, the F content was lower than 0.08 mass %.

In Examples 1-1 to 1-6 in which the F content was not higher than 0.61 mass %, resistance was lower than in Comparative Example 1-1. It may be because the moderately low F content reduced potential damage caused to the crystal structure by F introduction. With the F content being not higher than 0.61 mass %, the capacity loss rate tended to be low. In Table 1 above, a positive correlation is found between the resistance and the capacity loss rate.

In Reference Examples 1 to 7, the post-storage viscosity of the paste also tended to decrease as the F content increased. However, in Reference Examples 1 to 7, a remarkable increase in resistance attributable to F introduction was observed. It may be because no C was contained in the positive electrode active material. In Examples 1-1 to 1-6, C was contained in the positive electrode active material in an amount not lower than 0.02 mass %. In Examples 1-1 to 1-6, an increase in resistance attributable to F introduction may have been mitigated because C was contained in the positive electrode active material.

Figure 4:
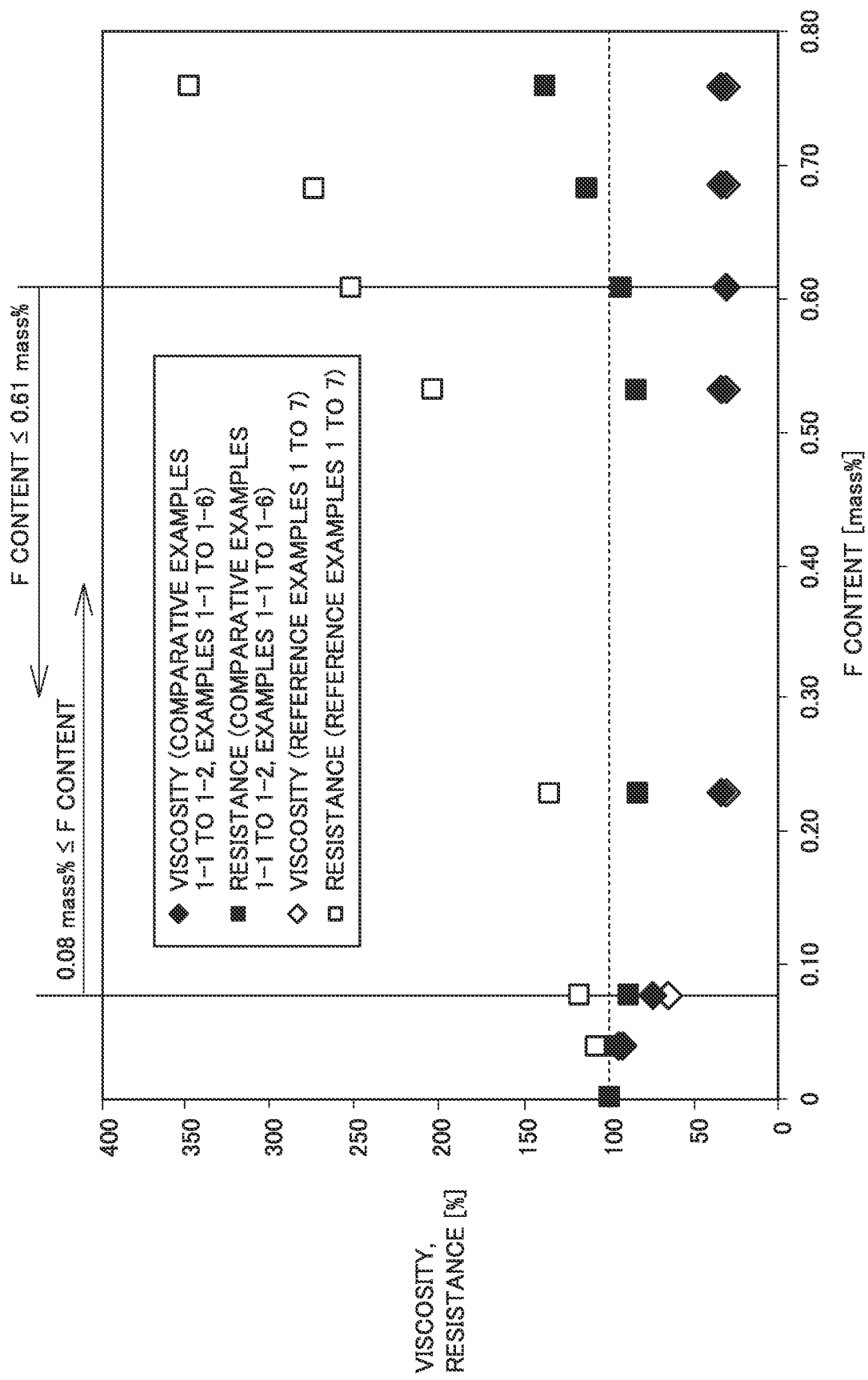
FIG. 4 is a graph illustrating the relation between the F content and both the viscosity and the resistance.

FIG. 4 is a graph illustrating the relation between the F content and both the viscosity and the resistance.

In FIG. 4, the experiment-based results listed in Table 1 above are plotted. In Reference Examples 1 to 7, the rate of increase in resistance accelerated as the F content increased, whereas in Comparative Example 1-2 and Examples 1-1 to 1-6, the rate of increase in resistance along with an increase in the F content was generally mild. In the latter, resistance was lower than 100% when the F content was between 0.08 mass % and 0.61 mass %; in other words, the resistance was lower than in Comparative Example 1-1. The way that the resistance changed suggests that the resistance was lowest when the F content was somewhere between 0.23 mass % and 0.53 mass %.

<Experiment 2>

In an Experiment 2, influence of the Ni content was studied.

<<Production of Positive Electrode Active Material>>

Examples 2-1 to 2-3

A positive electrode active material was produced in the same manner as in Example 1-1 except that the LiMeO particles specified in Table 2 below were used.

Comparative Examples 2-1 to 2-4

A positive electrode active material was produced in the same manner as in Comparative Example 1-1 except that the LiMeO particles specified in Table 2 below were used.

Comparative Example 2-5

A positive electrode active material was produced in the same manner as in Example 1-1 except that the LiMeO particles specified in Table 2 below were used.

<<Evaluation>>

The positive electrode active material, the conductive material, the binder, and the solvent were mixed, and thus a paste was prepared. Right after the paste was prepared, the viscosity of the paste was measured (hereinafter also called "initial viscosity"). The paste was stored in the atmosphere for one day. After the one-day storage, the post-storage viscosity was measured. Results are shown in Table 2 below. Each value in column "Viscosity" in Table 2 below is expressed as a percentage; the value is obtained by dividing the post-storage viscosity of each example by the initial viscosity of Comparative Example 2-4 and then converting the resultant into percentage.

TABLE 2

Experiment 2

Method of producing positive electrode active material

| | (a) Preparation of LiMeO particles | | (b) Mixing Fluorocarbon material (F source) | | (c) Heat treatment | | Positive electrode active material | | Paste storage test | |
|---|---|---|---|---|---|---|---|---|---|---|
| | Composition | Ni content (Ni/Me) mol % | Type | Content mass % | Atmosphere | Temp. °C. | F content mass % | C content mass % | Viscosity* % | (with F)/(without F) |
| Comp. Ex. 2-4 | LiNi$_{0.5}$Co$_{0.45}$Al$_{0.05}$O$_2$ | 50 | — | — | Ar | 550 | 0 | 0 | 112 | 112/112 = 1 |
| Comp. Ex. 2-5 | LiNi$_{0.5}$Co$_{0.45}$Al$_{0.05}$O$_2$ | 50 | PTFE | 0.10 | Ar | 550 | 0.08 | 0.02 | 112 | |
| Comp. Ex. 2-1 | LiNi$_{0.6}$Co$_{0.35}$Al$_{0.05}$O$_2$ | 60 | — | — | Ar | 550 | 0 | 0 | 171 | 136/171 = 0.80 |
| Ex. 2-1 | LiNi$_{0.6}$Co$_{0.35}$Al$_{0.05}$O$_2$ | 60 | PTFE | 0.10 | Ar | 550 | 0.08 | 0.02 | 136 | |
| Comp. Ex. 2-2 | LiNi$_{0.7}$Co$_{0.25}$Al$_{0.05}$O$_2$ | 70 | — | — | Ar | 550 | 0 | 0 | 187 | 138/187 = 0.74 |
| Ex. 2-2 | LiNi$_{0.7}$Co$_{0.25}$Al$_{0.05}$O$_2$ | 70 | PTFE | 0.10 | Ar | 550 | 0.08 | 0.02 | 138 | |
| Comp. Ex. 1-1 | LiNi$_{0.8}$Co$_{0.15}$Al$_{0.05}$O$_2$ | 80 | — | — | Ar | 550 | 0 | 0 | 574 | 182/574 = 0.32 |
| Ex. 1-1 | LiNi$_{0.8}$Co$_{0.15}$Al$_{0.05}$O$_2$ | 80 | PTFE | 0.10 | Ar | 550 | 0.08 | 0.02 | 182 | |
| Comp. Ex. 2-3 | LiNi$_{0.9}$Co$_{0.05}$Al$_{0.05}$O$_2$ | 90 | — | — | Ar | 550 | 0 | 0 | 592 | 183/592 = 0.31 |
| Ex. 2-3 | LiNi$_{0.9}$Co$_{0.05}$Al$_{0.05}$O$_2$ | 90 | PTFE | 0.10 | Ar | 550 | 0.08 | 0.02 | 183 | |

*Each value is expressed as a percentage; the value is obtained by dividing the post-storage viscosity of each example by the initial viscosity of Comparative Example 2-4 and then converting the resultant into percentage.

<<Results>>

Figure 5:
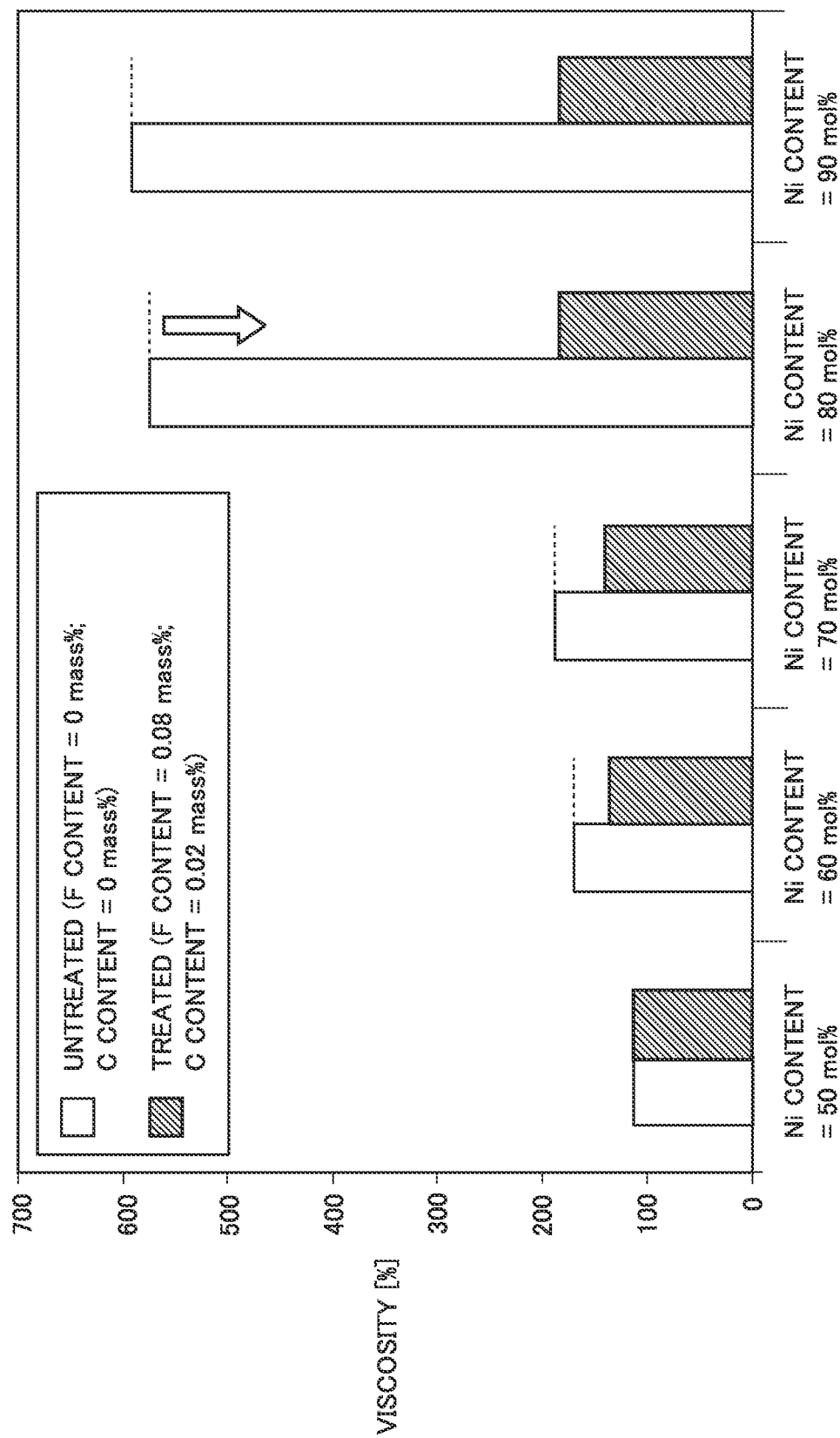
FIG. 5 is a graph illustrating the relation between the Ni content and the viscosity.

FIG. 5 is a graph illustrating the relation between the Ni content and the viscosity.

In FIG. 5, the experiment-based results listed in Table 2 above are plotted. When the Ni content is 50 mol %, almost no effect of decreasing post-storage viscosity is observed. It may be because when the LiMeO particles have a Ni content lower than 60 mol %, only a small amount of an alkaline component is formed.

When the Ni content is not lower than 60 mol %, an effect attributable to F introduction of decreasing post-storage viscosity is observed.

When the Ni content is not lower than 80 mol %, an effect attributable to F introduction of decreasing post-storage viscosity tends to be great. In other words, the effect of mitigating alkaline component formation may be great. It may be because when the Ni-rich positive electrode active material has a Ni content not lower than 80 mol %, a large amount of an alkaline component is formed.

The embodiments and examples disclosed herein are illustrative and non-restrictive in any respect. The technical scope indicated by the claims is intended to include any modifications within the scope and meaning equivalent to the terms of the claims.

What is claimed is:

1. A positive electrode active material for a lithium-ion secondary battery, the positive electrode active material being in a form of positive electrode active material particles comprising:
   fluorine in an amount in a range of 0.23 to 0.61 mass %;
   carbon in an amount in a range of 0.07 to 0.19 mass %; and
   lithium-metal composite oxide particles making up the remainder,
   the lithium-metal composite oxide particles containing nickel in an amount not lower than 60 mol % of a total amount of metallic elements, and
   each of the fluorine and the carbon being introduced into a surface region of the lithium-metal composite oxide particles that stretches for 100 nm from an outermost surface of the lithium-metal composite oxide particles in a direction toward a center of the lithium-metal composite oxide particles.

2. The positive electrode active material according to claim 1, wherein the lithium-metal composite oxide particles have a composition represented by the following formula (I):

$$LiNi_xCo_yAl_zO_2 \quad (I)$$

where x, y, and z satisfy the following relations:

$$0.6 \leq x \leq 0.9;$$

$$x+y+z=1; \text{ and}$$

$$y \geq z.$$

3. The positive electrode active material according to claim 1, wherein the lithium-metal composite oxide particles contain nickel in an amount not lower than 80 mol % of the total amount of metallic elements.

4. The positive electrode active material according to claim 1, wherein alkaline component formation on a surface of the positive electrode active material is mitigated by the fluorine in the amount in the range of 0.23 to 0.61 mass %.

5. A positive electrode including at least the positive electrode active material according to claim 1.

6. A lithium-ion secondary battery including at least the positive electrode according to claim 5.

7. A method of producing the positive electrode active material according to claim 1, the method comprising:
   preparing the lithium-metal composite oxide particles;
   mixing the lithium-metal composite oxide particles with a fluorocarbon material to prepare a mixture; and
   heating the mixture in an inert atmosphere to produce the positive electrode active material.

8. The method according to claim 7, wherein:
   the fluorocarbon material is polytetrafluoroethylene; and
   the mixture is heated in the inert atmosphere at a temperature in a range from 400° C. to 550° C.

9. The method according to claim 8, wherein the mixture contains polytetrafluoroethylene in an amount not lower than 0.10 mass % of the amount of the mixture.

10. The method according to claim 8, wherein the mixture contains polytetrafluoroethylene in an amount not higher than 0.80 mass % of the amount of the mixture.

\* \* \* \* \*